United States Patent
Väänänen et al.

(10) Patent No.: US 8,194,542 B2
(45) Date of Patent: Jun. 5, 2012

(54) METHOD AND EQUIPMENT FOR PERFORMING FLOW SHAPING THAT MAINTAINS SERVICE QUALITY IN PACKET-SWITCHED TELECOMMUNICATIONS

(75) Inventors: Janne Väänänen, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 993 days.

(21) Appl. No.: 10/574,006

(22) PCT Filed: Oct. 14, 2004

(86) PCT No.: PCT/FI2004/000613
§ 371 (c)(1),
(2), (4) Date: Mar. 29, 2006

(87) PCT Pub. No.: WO2005/039124
PCT Pub. Date: Apr. 28, 2005

(65) Prior Publication Data
US 2007/0002741 A1 Jan. 4, 2007

(30) Foreign Application Priority Data
Oct. 17, 2003 (FI) .................................. 20031524

(51) Int. Cl.
*G01R 31/08* (2006.01)
*H04J 1/16* (2006.01)
*G06F 15/173* (2006.01)
(52) U.S. Cl. ............... 370/230.1; 370/232; 370/235; 709/223
(58) Field of Classification Search ........... 370/229, 370/230, 230.1, 235, 351, 352, 353, 389, 370/412; 709/223–226, 230, 236, 238, 240, 709/241; 704/503, 504
See application file for complete search history.

(56) References Cited

U.S. PATENT DOCUMENTS
6,023,456 A 2/2000 Chapman et al.
(Continued)

FOREIGN PATENT DOCUMENTS
EP 1 124 356 A2 8/2001
(Continued)

OTHER PUBLICATIONS

P. Goyal et al, "Start-time Fair Queuing: A Scheduling Algorithm for Integrated Services Packet Switching Networks," pp. 1-12, Proceedings of SIGCOMM 1996.

(Continued)

*Primary Examiner* — Ricky Ngo
*Assistant Examiner* — Paul H Masur
(74) *Attorney, Agent, or Firm* — Hamilton, Brook, Smith & Reynolds, P.C.

(57) ABSTRACT

The invention relates to a method and equipment for performing flow shaping that maintains service quality in packet-switched telecommunications. Using the method according to the invention, the speed properties (OR, PIR, CBS) of an aggregate flow (A) can be monitored and limited in a situation, in which the aggregate flow contains delay-critical traffic (V1), the forwarding of packets representing which cannot be delayed. The invention is based on the fact that, when forwarding packets representing the aggregate flow, a variable is updated, the value of which expresses the earliest permitted moment, at which a packet, representing traffic (V2) other than the delay-critical traffic, can be forwarded. In that case, the transfer speed of the traffic (V2) other than delay-critical traffic adapts to the variations in the transfer speed of the delay-critical traffic, allowing the speed properties of the aggregate flow to be monitored and limited.

22 Claims, 5 Drawing Sheets

U.S. PATENT DOCUMENTS

| | | |
|---|---|---|
| 6,449,255 B1 | 9/2002 | Waclawsky |
| 6,532,213 B1 | 3/2003 | Chiussi et al. |
| 6,549,514 B1 | 4/2003 | Kilkki et al. |
| 6,606,301 B1 * | 8/2003 | Muller et al. ............... 370/230 |
| 6,965,566 B2 * | 11/2005 | Kawasaki et al. ............ 370/235 |
| 7,061,861 B1 * | 6/2006 | Mekkittikul et al. ......... 370/230 |
| 2001/0029457 A1 * | 10/2001 | Shaffer et al. ................ 704/504 |
| 2002/0167957 A1 * | 11/2002 | Brandt et al. ................. 370/412 |
| 2003/0099200 A1 | 5/2003 | Kiremidjian et al. |
| 2003/0165116 A1 | 9/2003 | Fallon et al. |
| 2003/0165148 A1 * | 9/2003 | Bishard ........................ 370/412 |
| 2003/0223369 A1 * | 12/2003 | Anderson .................... 370/235 |
| 2004/0066743 A1 * | 4/2004 | Shimojo et al. .............. 370/229 |
| 2004/0100967 A1 * | 5/2004 | Robotham et al. ......... 370/395.4 |
| 2004/0105393 A1 * | 6/2004 | Ronneke et al. ............. 370/252 |

FOREIGN PATENT DOCUMENTS

| | | |
|---|---|---|
| EP | 1 199 851 A1 | 4/2002 |
| EP | 1 227 624 A2 | 7/2002 |
| EP | 1 345 365 A2 | 9/2003 |
| EP | 1 372 306 A3 | 12/2003 |
| WO | WO-02/063837 A1 | 8/2002 |

OTHER PUBLICATIONS

Blake et al., "An Architecture for Differentiated Services," RFC 2475, Dec. 1998, pp. 1-36.

G. Stattenberger et al., "Performance evaluation of a Linux DiffServ implementation," Computer Communications 25 (2002), pp. 1195-1213, Elsevier.

* cited by examiner

METHOD AND EQUIPMENT FOR PERFORMING FLOW SHAPING THAT MAINTAINS SERVICE QUALITY IN PACKET-SWITCHED TELECOMMUNICATIONS

The present invention relates to a method for performing flow shaping that maintains service quality in packet-switched telecommunications.

The invention also relates to equipment for performing flow shaping that maintains service quality in packet-switched telecommunications.

In this publication, the following abbreviations are used in the depiction of both the prior art and the invention:

| | |
|---|---|
| CBS | Committed Burst Size (greatest permitted burst size [bit]), when exceeding the committed information flow, |
| CIR | Committed Information Rate (greatest permitted mean traffic speed [bit/s]), |
| CoS | Class of Service |
| FIFO | First In, First Out discipline, |
| MP | Measuring Point, in which the speed characteristics of the traffic flow are measured (e.g., mean traffic speed, momentary traffic speed, bust size), |
| PIR | Peak Information Rate (greatest permitted momentary traffic speed [bit/s]), |
| PKS | Packet size in bits, |
| V1, V2, ... | Traffic flow 1, 2, ..., |
| VTS | The earliest moment in time, after which the next packet representing a specific traffic flow may be forwarded, in order that not even one rule set for a speed property of the traffic flow in question will be broken (Valid Time to Send), |
| VTS_CIR | The earliest moment in time, after which the next packet may be forwarded, in order that the greatest permitted mean speed and/or the greatest permitted burst size will not be exceeded, |
| VTS_PIR | The earliest moment in time, after which the next packet may be forwarded, in order that the greatest permitted momentary speed will not be exceeded. |

In packet-switched telecommunications systems, it is often advantageous if the packets being transmitted are classified in different service classes (CoS) according, on the one hand, to the requirements of the applications using the telecommunications service and, on the other, to the kind of service-quality agreements that the telecommunications service provider (Service Provider) has made with its customers. For example, in a telephone application (Voice over Internet), it is essential for the data-transfer delay and the variation of the delay to remain below the permitted limit values. The permitted limit-values are often defined in a service-quality agreement. However, when downloading www pages, for example, the data-transfer delay and its variation are significantly less critical quantities.

It is often wished to monitor and limit the speed properties of a traffic flow formed from packets to be transferred. Such a situation occurs, for example, if it is wished to reserve a specific portion of the data-transmission capacity of a transfer link for a specific customer, so that the traffic of the customer in question will not be permitted to exceed the transmission capacity reserved for him. The traffic flow being examined thus consists of packets representing the traffic of the customer in question, which can represent differ service classes. In other words, a virtual transfer link is formed to the customer in question, the transmission capacity of which is part of the capacity of the physical transfer link used for the implementation. A speed property can refer to, for example, the mean speed of the traffic (CW), the burst size (CBS), by which the mean speed can be momentarily exceeded, or the momentary speed (PIR). Taken more generally, the traffic flow can consist of, for example, packets to be routed to a specific transfer link, packets with a specific source address and sent by a specific end user, or packets that belong to a specific class of service (CoS) and are to be routed to a specific transfer link. In the rest of this publication, a system, which can be used to monitor and limit the speed properties of a traffic flow, will be referred to as a 'shaper' and the operation, in which the speed properties of a traffic flow are monitored and limited, will be referred to as 'shaping'.

The following examines a system, to which two traffic flows V1 and V2 arrive. The traffic flow V1 arriving in the system represents delay-critical traffic (e.g., Voice over Internet), for which a greatest permitted delay and delay variation have been defined. The traffic flow V2 arriving in the system represents traffic that is considerably less delay-critical than that of flow V1. The traffic flows V1 and V2 are multiplexed to a common transfer link S leaving the system. Multiplexing is performed on the basis of priority, in such a way that the packets representing the traffic flow V1 are forwarded with a higher priority than the packets representing the traffic flow V2, because traffic flow V1 represents delay-critical traffic. It is wished to monitor and limit the speed properties of the aggregate flow A being transmitted to the transfer link S.

Figure 1:
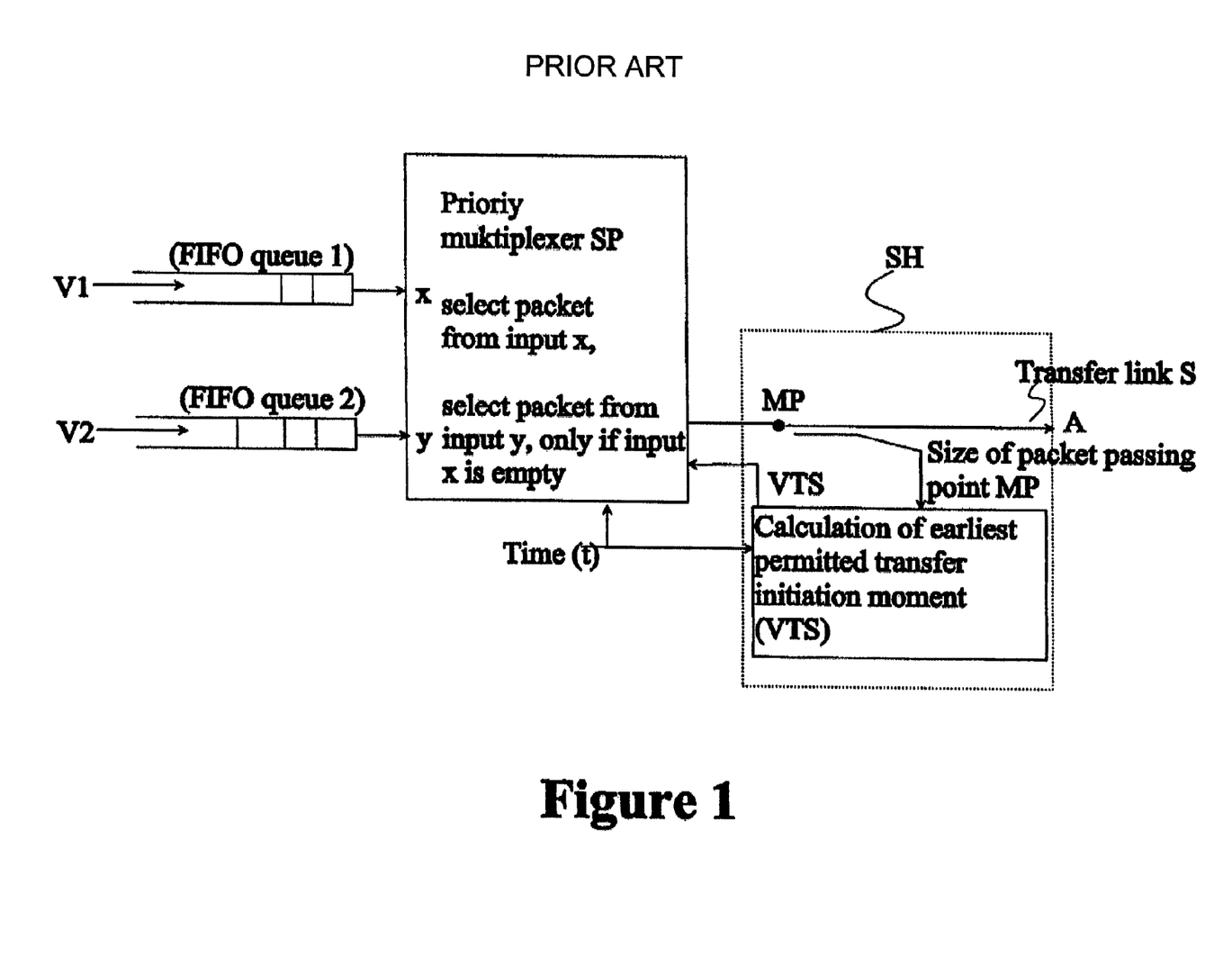
FIG. 1 shows a block diagram of one system according to the prior art, by means of which the speed properties of an aggregate flow A can be monitored and limited.

FIG. 1 shows one way, according to the prior art, of monitoring and limiting the speed properties of the aggregate flow A. In the following examination that elucidates the matter, the term speed properties is used to include mean speed (CIR [bit/s]), burst size (CBS [bit]), by which the mean speed can be exceeded temporarily, and momentary speed (PIR [bit/s]). When packets are begun to be transferred past the measurement point (MP) marked in FIG. 1 (i.e. when the first bit of the packet being transferred passes the point MP), the values of the variables. VTS_CIR and VTS_PIR are calculated for the next packet. VTS_CIR gives the earliest permitted moment in time, when the next packet can be begun to be transferred past MP, in order not to exceed the OR or the CBS restrictions. Correspondingly, VTS_PIR gives the earliest permitted moment in time, when the next packet can be begun to be transferred past MP, in order not to exceed the PIR restriction. The equations 1 and 2 show the principle generally used for calculating the VST_CIR and the VTS_PIR values.

$$VTS\_CIR_{next} = \max(t - CBS/CIR, VTS\_CIR_{ed}) + PKS_{ed}/CIR, \quad (1)$$

and $$VRS\_PIR_{next} = \max(t, VTS\_PIR_{ed}) + PKS_{ed}/PIR, \quad (2)$$

in which t is the time, PKS is the size of the packet in bits, the sub-index 'next' refers to the next packet and the sub-index 'ed' refers to the packet, the first bit of which is transferred past point MP at the moment t.

When all the speed properties are taken into account, the earliest permitted moment (VTS), when the next packet can begin to be transferred past point MP, is obtained from equation 3.

$$VTS = \max(VTS\_CIR, VTS\_PIR). \quad (3)$$

The multiplexer SP only selects the next packet to be transferred, once enough time has elapsed that $t [\$] \geq VTS$.

A problem in the system shown in FIG. 1 is that the packets representing the traffic flow V1 too are delayed. This can cause the transmission delays of the packets representing the traffic flow V1 to increase over the permitted limit values. This has resulted in the system shown in FIG. 2, in which the FIFO queue 2, which stores the packets representing the traffic flow V2, offers the packets to the multiplexer SP only once enough time has elapsed that t≧VTS, becoming established as the system generally used according to the prior art. The system shown in FIG. 2 does not delay the packets representing the traffic flow V1, and thus does not diminish the delay properties of the traffic flow V1. In other words, the quality of service required for the traffic flow V1 is maintained. The functioning of the system depends on the assumption that the speed properties of the traffic flow V1 arriving at the system are sufficiently within the desired limits. In that case, the speed properties of the aggregate flow A will be sufficiently within the desired limits, because the speed limits of the other sub-factor—the traffic flow V2—are monitored and limited. Naturally, one problem is the uncertainty concerning the speed properties of the traffic flow V1 and another problem is the fact that temporal variation in the speed properties of the traffic flow V1 appears directly as a temporal variation in the speed properties of the aggregate flow A, FIG. 3.

The present invention is intended to eliminate the defects of the prior art disclosed above and for this purpose create an entirely new type of method and equipment for performing flow shaping that retains the quality of service in packet-switched telecommunications. The aim of the invention is a method and equipment for performing shaping in such a way as to avoid the aforementioned problems relating to the prior art.

One aspect of the invention is directed to perform flow shaping that maintains service quality in a packet-switched telecommunication system. This aspect of the invention features transferring digital information as constant or variable-length packets, wherein the packets arrive in the system as at least two separate traffic flows, the packets arriving in the system are forwarded from the system along one or more transfer links, wherein as a result of the forwarding of packet representing a specific first traffic flow arriving in the system, at least one such variable is updated, which is also updated as a result of the forwarding of packets representing a specific second traffic flow arriving in the system, and a packet representing the first said traffic flow is forwarded independently of the said variable, and the earliest permitted moment of forwarding a packet representing the said second traffic flow is defined, at least partly, on the basis on the said variable.

Another aspect of the invention is directed to an equipment for performing flow shaping that maintains service quality in a packet-switched telecommunication system, in which the equipment includes means for receiving constant or variable-length packets carrying digital information, means for classifying a packet arriving in the system as representing one of the traffic flows arriving in the system, and means for forwarding packets to an outgoing link or links, wherein the equipment further includes means, with the aid of which it is possible to update, as a result of the forwarding of a packet representing a first specific traffic flow, such a variable that can also be updated as a result of the forwarding of a packet representing a specific second traffic flow, and with the aid of which means a packet representing the first said variable, and with the aid of which means it is possible to define the earliest permitted moment, at which a packet representing the second said traffic flow can be forwarded, at least partly on the basis of the said variable.

In the following, the invention is examined in greater detail with the aid of examples according to the accompanying figures.

The theoretical basis of the method according to the invention will become apparent from the following examination.

Traditionally, flow-shaping machinery operates in such a way that, in connection with the traffic flows being monitored, the corresponding VTS values are updated, for example, as shown in equations 1, 2, and 3 and, if necessary, the forwarding of the packets relating to the traffic flows being monitored is delayed. The method according to the invention is characterized by the fact that, in connection with one or more specific traffic flows, the shaping machinery operates in such a way that it only updates the VTS values, but does not delay the packets representing the relevant traffic flows. The delaying performed on the basis of the relevant VTS values is applied to the forwarding of packets representing the other traffic flows.

Figure 4:
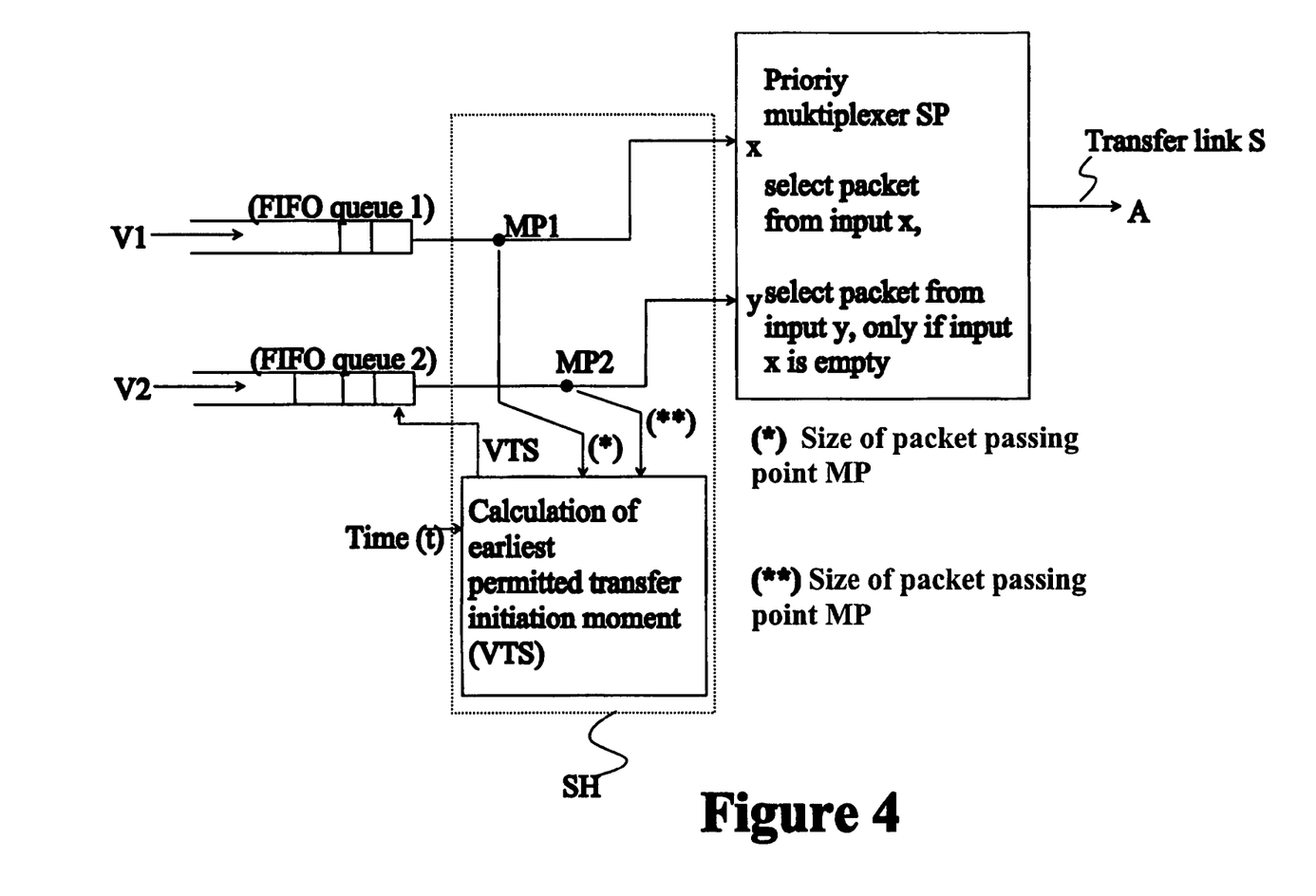
FIG. 4 shows a block diagram of one system according to the invention, by means of which the speed properties of an aggregate flow A can be monitored and limited.
Figure 5:
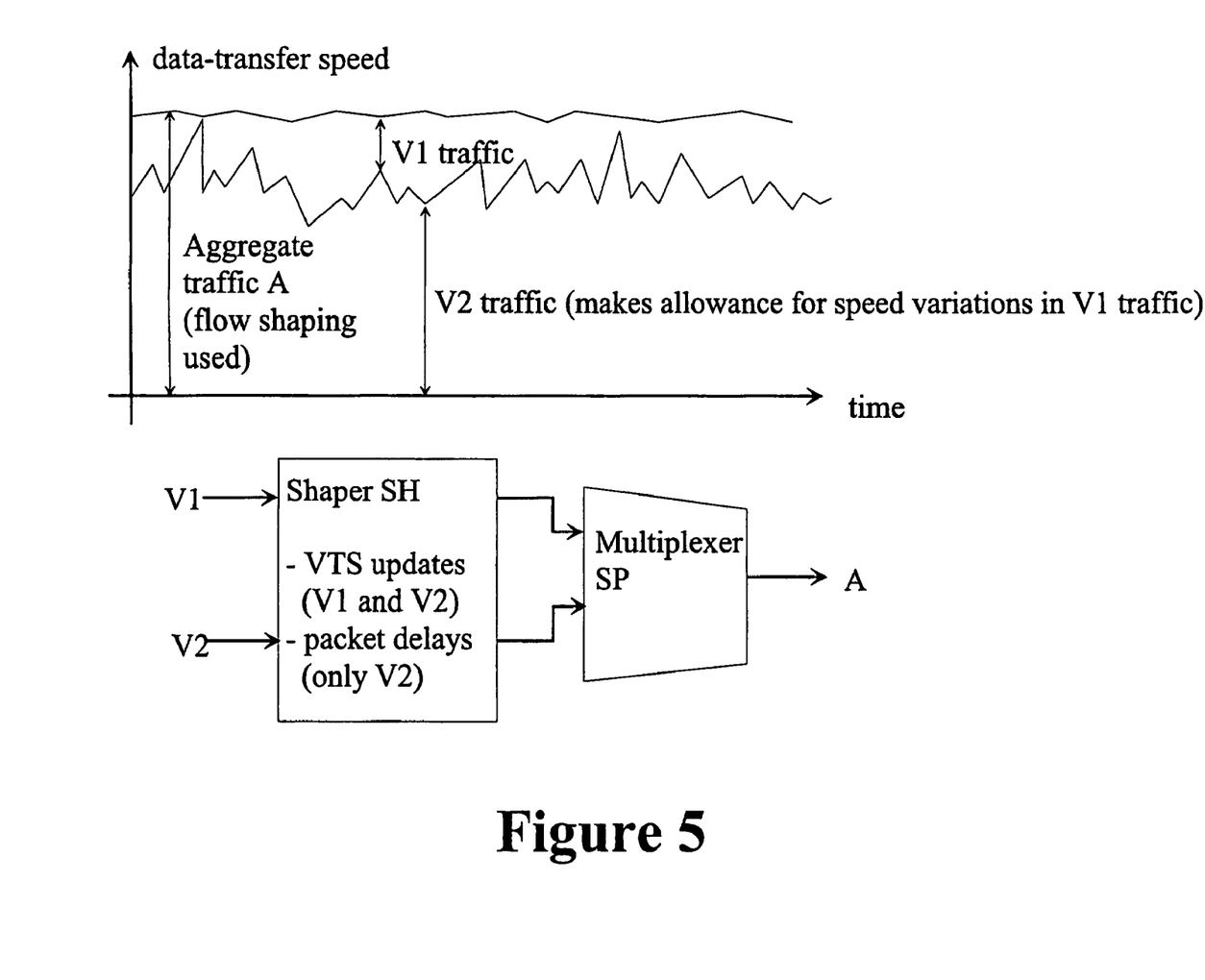
FIG. 5 shows the operation of a system according to the invention.

The operation of the method according to the invention will be examined with the aid of one system according to the invention, shown in FIG. 4. When a packet representing the traffic flow V1 is transferred past the measurement point MP1, the VTS values are updated in a manner according to equations 1, 2, and 3. Correspondingly, when transferring a packet representing the traffic flow V2 past the measurement point MP2, the said VTS values are updated in a manner according to equations 1, 2, and 3. No restrictions are set for the FIFO queue 1, which stores packets representing the traffic flow V1, as to when the FIFO queue 1 can offer packets to the input x of the multiplexer SP. The FIFO queue 2 storing packets representing the traffic flow V2, on the other hand, can only offer packets to the input y of the multiplexer SP, if the moment of time t being examined is at least as great as the VTS value (t≧VTS). This means that the transmission speed of the traffic flow V2 is effectively limited in a situation, in which the transmission speed of the traffic flow V1 is high, as the VTS value will increase rapidly purely due to the effect of the forwarding of packets representing the traffic flow V1. Correspondingly, in a situation, in which the transmission speed of the traffic flow V1 is low, the transmission speed of the traffic flow V2 will be limited considerably less, as the forwarding of packets representing the traffic flow V1 will have little effect in increasing the VTS values. Thus, the operation shown in FIG. 5 will be achieved, in which the transmission speed of the traffic flow V2 will adapt to variations in the transmission speed of the traffic flow V1. The speed properties of the aggregate flow A can thus be monitored and limited, without requiring packets representing the traffic flow V1 to be delayed.

The method according to the invention can also be used when some other multiplexer than one based on priority is used, for example, a weight-coefficient-based multiplexer (WFQ, Weighted Fair Queuing) [1].

REFERENCES

[1] Pawan Goyal, Harric M. Vin, Haichen Cheng. Start-time Fair Queuing: A Scheduling Algorithm for Integrated Services Packet Switching Networks. Technical Report TR-96-02, Department of Computer Sciences, University of Texas Austin.

The invention claimed is:

1. A method comprising:
updating a variable as a result of forwarding a packet representing a first traffic flow and a packet representing a second traffic flow, the first and second traffic flows being separate traffic flows and said variable indicating an earliest permitted moment a next packet is allowed to be forwarded without violating at least one transmission speed limitation related to flow shaping; and
forwarding the next packet independently of said variable if the next packet represents the first traffic flow, allowing the next packet to be forwarded earlier than the earliest permitted moment and forwarding the next packet not earlier than the earliest permitted moment if the next packet represents said second traffic flow.

2. The method according to claim 1, wherein the earliest permitted moment for forwarding the packet representing the second traffic flow is defined solely on the basis of said variable.

3. The method according to claim 1 wherein a Valid Time to Send (VTS) value is used as said variable.

4. The method according to claim 3, wherein the updating said variable comprises updating the VTS value on the basis of maximum permitted burst size and maximum permitted mean transmission speed related to the flow shaping of the aggregate of the first and second traffic flows.

5. The method according to claim 1, further including forwarding packets representing the first traffic flow at a higher priority (Strict Priority) than packets representing the second traffic flow.

6. The method according to claim 1, wherein packets carry digital information, the digital information is transferred as constant or variable-length packets.

7. The method according to claim 1, further comprising forwarding the packets representing the first and second traffic flows along a plurality of transfer links.

8. The method according to claim 1, further comprising multiplexing the first and second traffic flows on the basis of Weighted Fair Queuing (WFQ).

9. An equipment including:
a queue configured to receive packets;
a classifier configured to classify a packet arriving in the equipment as representing one of a first traffic flow and a second traffic flow, the first and second traffic flows being separate traffic flows;
a shaper configured to (i) update a variable as a result of forwarding packets representing the first traffic flow to one or more outgoing links and as a result of forwarding packets representing the second traffic flow to the one or more outgoing links, said variable indicating after each forwarding the earliest permitted moment when a next packet can be forwarded without violating transmission speed limitations related to flow shaping of an aggregate of the first and second traffic flows, and (ii) define, on the basis of said variable, the earliest permitted moment; and
a transfer unit configured to forward the next packet independently of said variable if the next packet represents the first traffic flow, allowing the next packet to be forwarded earlier than the earliest permitted moment, and configured to forward the next packet not earlier than the earliest permitted moment if the next packet represents said second traffic flow.

10. The equipment according to claim 9, wherein the shaper is further configured to define the earliest permitted moment of forwarding the packet representing the second traffic flow solely on the basis of said variable.

11. The equipment according to claim 9, wherein the shaper is configured to use a Valid Time to Send (VTS) value as said variable.

12. The equipment according to claim 11, wherein the shaper is further configured to update the VTS value on the basis of maximum permitted burst size and maximum permitted mean transmission speed related to the flow shaping of the aggregate of the first and second traffic flows.

13. The equipment according to claim 9, wherein the equipment includes a multiplexer configured to schedule packets representing the first traffic flow to be forwarded at a higher priority (Strict Priority) than packets representing the second traffic flow.

14. The equipment according to claim 9, wherein the queue for receiving packets is configured to receive constant or variable-length packets.

15. The equipment according to claim 9, wherein the transfer unit is configured to forward the packets representing the first and second traffic flows along a plurality of transfer links.

16. The equipment according to claim 9, further comprising a multiplexer configured to multiplex the first and second traffic flows on the basis of Weighted Fair Queuing (WFQ).

17. A method comprising:
forwarding packets representing an aggregate flow, the aggregate flow including a delay-critical first traffic flow and a non-delay-critical second traffic flow, the first and second traffic flows being separate traffic flows; and
updating a variable as a result of the forwarding of packets representing the aggregate flow, a value of said variable representing the earliest moment a next packet representing the aggregate flow is allowed to be forwarded without violating transmission speed limitations related to flow shaping of the aggregate flow, forwarding the next packet independently of said variable if the next packet represents the delay-critical first traffic flow, allowing the next packet to be forwarded earlier than the earliest permitted moment, and forwarding the next packet not earlier than the earliest permitted moment, if the next packet represents the non-delay-critical second traffic flow.

18. The method according to claim 17, wherein transmission speed of the non-delay-critical second traffic flow adapts to variations in transmission speed of the delay-critical first traffic flow so that speed properties of the aggregate flow are controlled without delaying the forwarding of the delay-critical first traffic flow.

19. The method according to claim 17, further comprising updating said variable on the basis of maximum permitted burst size and maximum permitted mean transmission speed related to the flow shaping of the aggregate flow.

20. An equipment comprising:
a transfer unit configured to forward packets representing an aggregate flow, the aggregate flow including a delay-critical first traffic flow and a non-delay-critical second traffic flow, the first and second traffic flows being separate traffic flows; and
a shaper configured to update a variable as a result of forwarding the packets representing the aggregate flow, a value of said variable representing the earliest moment a next packet representing the aggregate flow is allowed to be forwarded without violating transmission speed limitations related to flow shaping of the aggregate flow, the transfer unit further configured to forward the next packet independently of said variable if the next packet represents the delay-critical first traffic flow, allowing the next packet to be forwarded earlier than the earliest permitted moment, and to forward the next packet not earlier than the earliest moment represented by said variable if the next packet represents said non-delay-critical second traffic flow.

21. The equipment according to claim 20, wherein the shaper is further configured to cause transmission speed of the non-delay-critical second traffic flow to adapt to variations in transmission speed of the delay-critical first traffic flow so that speed properties of the aggregate flow are controllable without delaying forwarding of the delay-critical first traffic flow.

22. The equipment according to claim 20, wherein the shaper is further configured to update said variable on the basis of maximum permitted burst size and maximum permitted mean transmission speed related to the flow shaping of the aggregate flow.

* * * * *

UNITED STATES PATENT AND TRADEMARK OFFICE
CERTIFICATE OF CORRECTION

| | |
|---|---|
| PATENT NO. | : 8,194,542 B2 |
| APPLICATION NO. | : 10/574006 |
| DATED | : June 5, 2012 |
| INVENTOR(S) | : Janne Väänänen and Mikko Laulainen |

Figure 2:
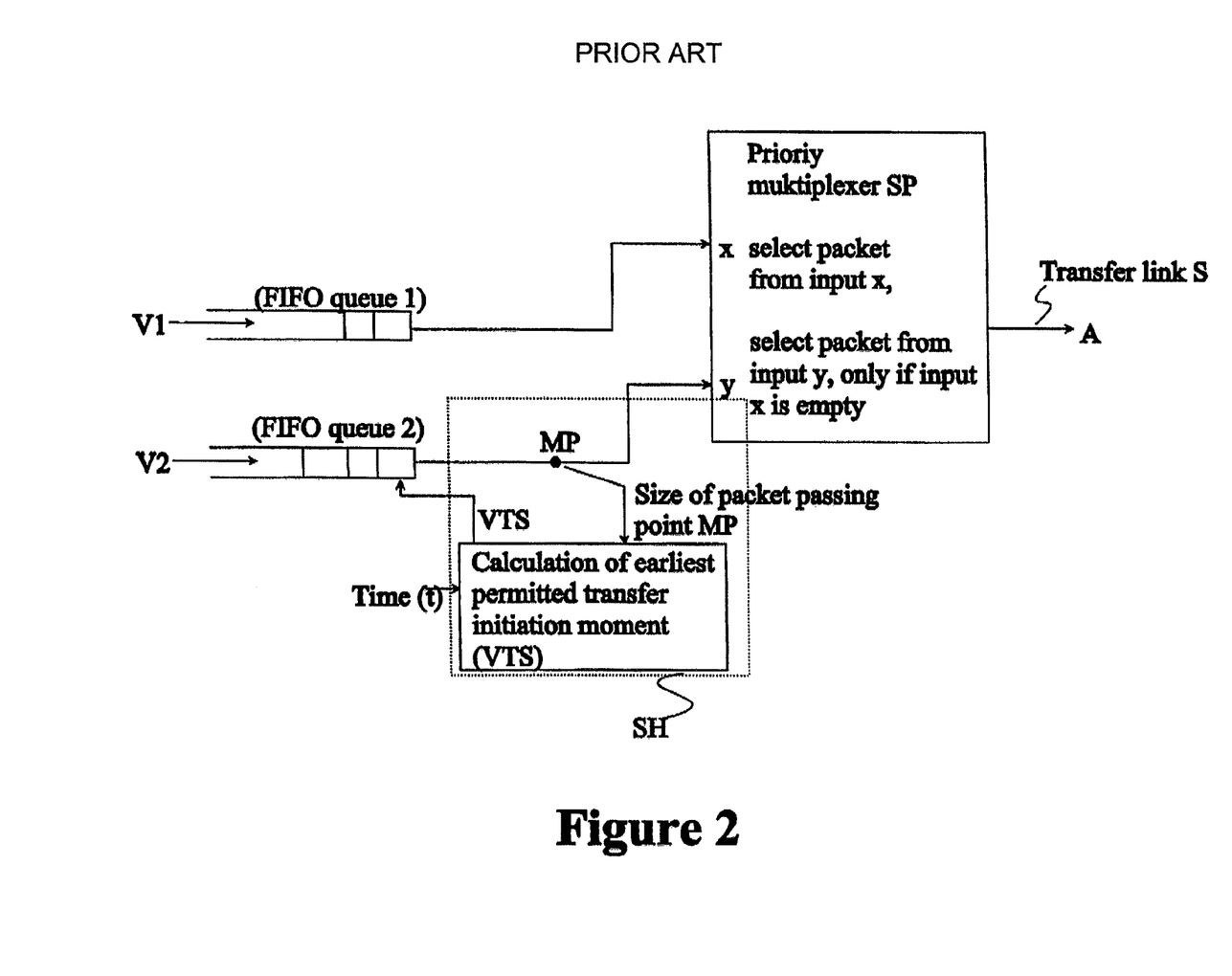
FIG. 2 shows a block diagram of a second system according to the prior art, by means of which the speed properties of an aggregate flow A can be monitored and limited.
Figure 3:
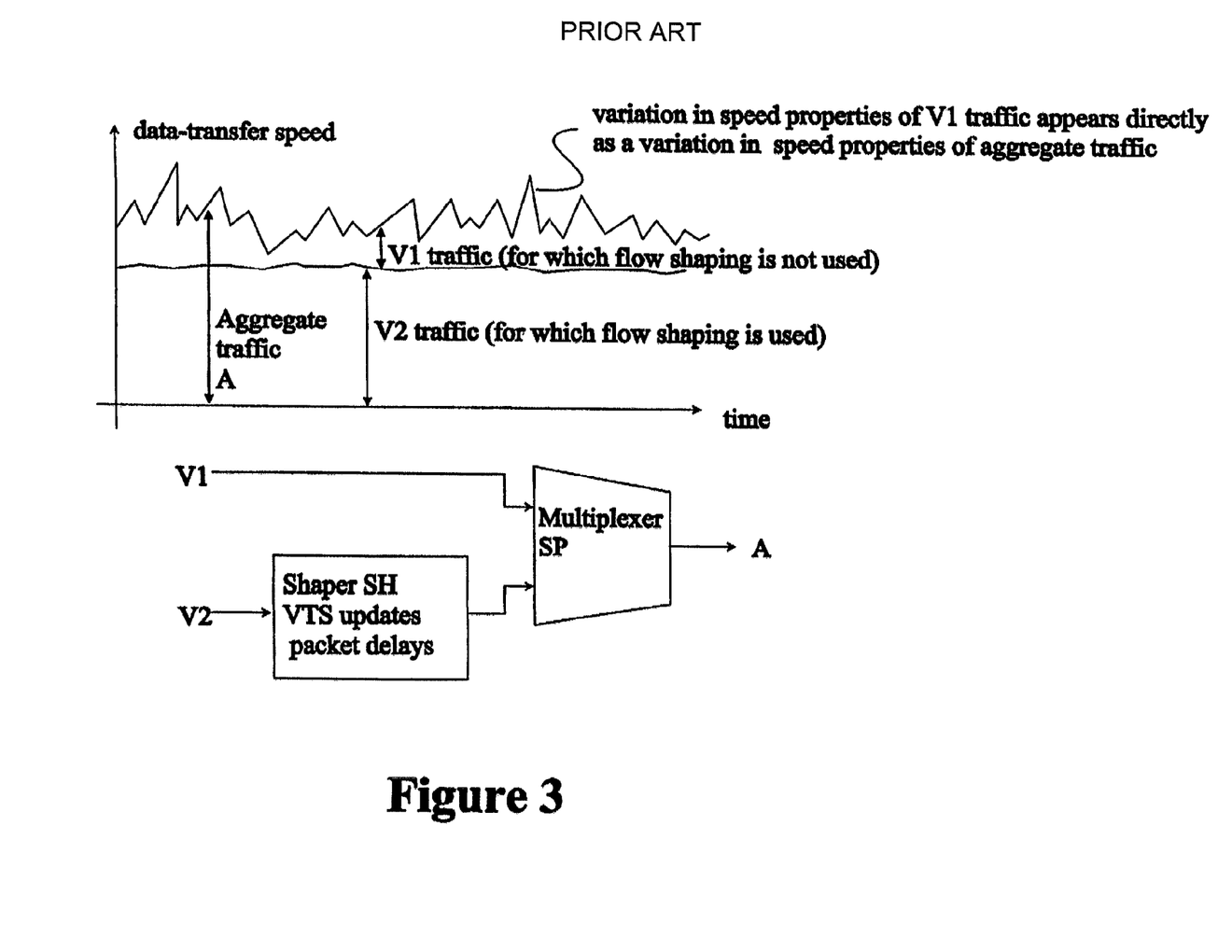
FIG. 3 shows the operation of the system according to FIG. 2.

It is certified that error appears in the above-identified patent and that said Letters Patent is hereby corrected as shown below:

Delete figs. 1, 2 and 4 and substitute therefor the drawing sheets, consisting of figs. 1, 2 and 4 as shown on the attached pages.

Signed and Sealed this
Twenty-third Day of October, 2012

David J. Kappos
*Director of the United States Patent and Trademark Office*